A. T. NYE.
OVEN DOOR FOR GAS AND VAPOR STOVES.
APPLICATION FILED APR. 5, 1916.
1,209,326.
Patented Dec. 19, 1916.
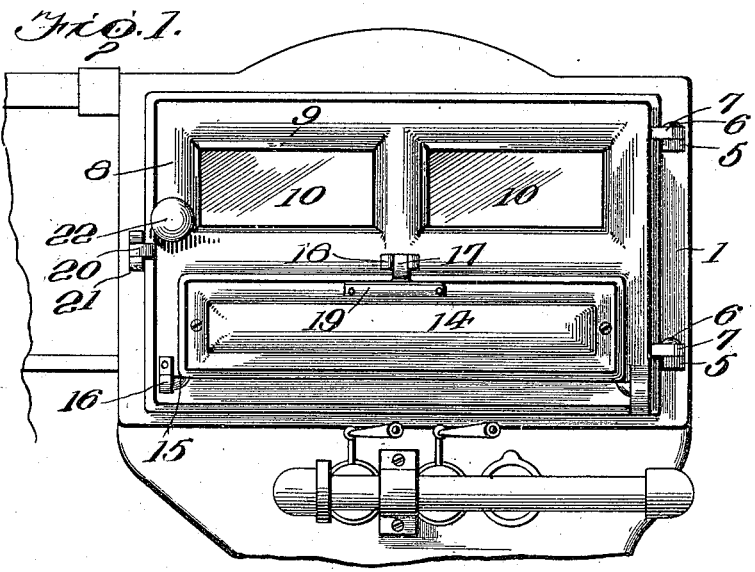
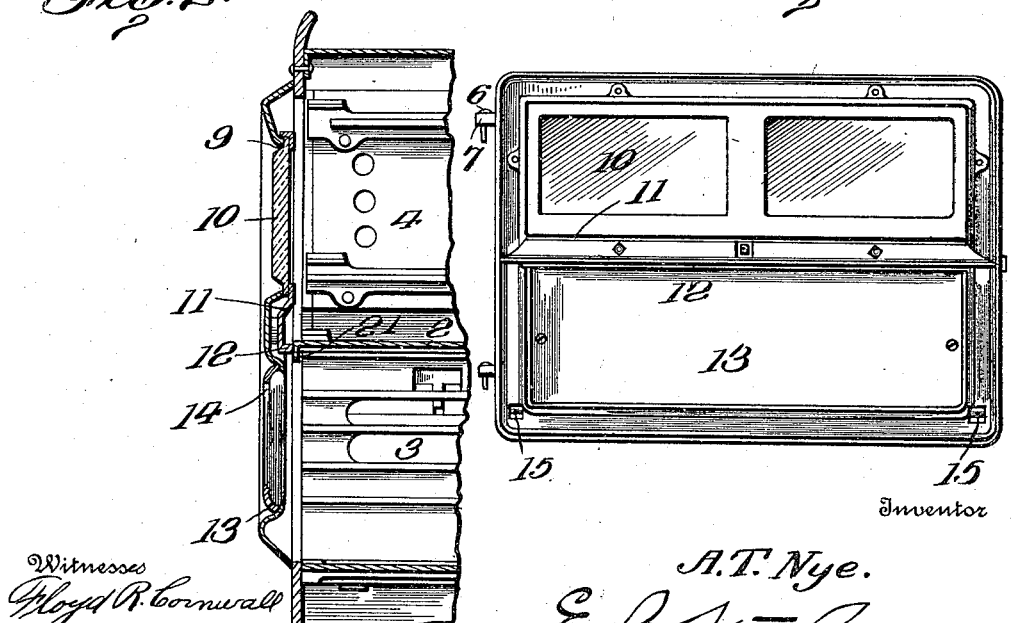

UNITED STATES PATENT OFFICE.

ANSELM T. NYE, OF MARIETTA, OHIO.

OVEN-DOOR FOR GAS AND VAPOR STOVES.

1,209,326.  Specification of Letters Patent.  Patented Dec. 19, 1916.

Application filed April 5, 1916. Serial No. 89,162.

*To all whom it may concern:*

Be it known that I, ANSELM T. NYE, a citizen of the United States, residing at Marietta, in the county of Washington and State of Ohio, have invented certain new and useful Improvements in Oven-Doors for Gas and Vapor Stoves, of which the following is a specification, reference being had therein to the accompanying drawing.

This invention relates to several new and useful improvements in oven doors for gas and vapor stoves, especially adapted to be used in connection with an oven provided with superposed oven chambers, the object being to provide a door for closing said oven chambers having an auxiliary door communicating with the lower oven chamber whereby access is obtained to the lower oven chamber without opening the upper oven chamber.

Another object of my invention is to provide a door with an auxiliary door mounted on horizontally disposed pivots so as to swing downwardly into horizontal position to form a shelf for supporting the articles being placed within the stove or removed therefrom.

I am aware that I am not the first in the art to provide an oven door with an auxiliary door, but prior to my invention the auxiliary door was formed in the upper portion of the main door and could not be used in connection with an oven employing a pair of superposed oven chambers in which the degree of temperature varies approximately 100 degrees so as to produce a fast baking oven and a slow baking oven with a door having an auxiliary door affording access to the fast baking oven so that the article being baked therein can be inserted and removed without changing the degree of temperature in the slow baking oven.

Other and further objects and advantages of the invention will be hereinafter set forth and the novel features thereof defined by the appended claims.

In the drawing, Figure 1 is a side elevation of a portion of an oven showing the application of my improved construction of door thereto. Fig. 2 is a vertical section through the oven and door showing the auxiliary door closed. Fig. 3 is an inside plan view of the door.

Like numerals of reference refer to like parts in the several figures of the drawing.

In carrying out my invention I employ an oven formed of a casing having a front plate 1 for closing the open front thereof, said casing having a centrally disposed division plate 2, forming superposed oven chambers 3 and 4 in which the degree of temperature varies approximately one hundred degrees so as to produce a slow baking oven and a fast baking oven.

The plate 1 is provided with apertured lugs 5 adapted to receive the pintle pins 6 or lugs 7, carried by a door frame 8, which is provided with sight openings 9 having glass plates 10 secured therein by an inner frame 11 secured to the main frame of the door as shown in Fig. 3, said inner frame 11 terminating at its lower edge in a lateral projecting flange portion 12 adapted to engage a flange 2' formed on the forward edge of the division plate 2 so as to form a tight closure between the superposed chambers 3 and 4 of the oven.

The frame 8 is provided with a door opening 13 at the lower portion thereof, closed by an auxiliary door 14 which is provided with laterally projecting pintles 15 mounted in bearing lugs 16 as clearly shown in Fig. 1 so as to allow the door 14 to drop into horizontal position to form access to the lower oven chamber 3, said pintles and bearings being so constructed that the door 14 will be held in horizontal position when in open position to form a shelf to support the articles being placed within and removed from the lower oven chamber. The auxiliary door is provided with a stud 17 adapted to engage a spring catch 18 carried by the main frame 8 so as to hold the door in closed position, said door being provided with a handle 19 which can be readily grasped so as to draw the stud 17 from out of the spring catch 18 to open the door or to close the same. The main door is also provided with a stud 20 which coöperates with a spring catch 21 carried by the plate 1 so as to hold the main door in closed position to form a closure for superposed oven chambers, said main door being provided with a knob 22 which can be readily grasped in order to open or close the door.

From the foregoing description it will be seen that I have provided an oven with a pair of superposed oven chambers formed by a division plate having a depending vertically disposed flange at its forward edge adapted to be engaged by a lateral flange formed on the door so as to form a tight closure for the superposed oven chambers, said main door being provided with an auxiliary door forming access to the quick baking lower oven chamber, whereby articles can be placed in the superposed oven chambers requiring different degrees of temperature in order to bake the same, and the quick baking oven chamber can be opened and closed so as to insert and remove the articles baked quickly without opening the upper or slow baking oven. It will also be seen that the auxiliary door when in lower position forms a shelf for inserting and removing the articles in the quick baking oven.

I claim:

1. In an oven having a pair of superposed oven chambers, of a main door for closing said oven chambers, said main door having an auxiliary door forming access to the lower oven chamber.

2. In an oven having a flanged division plate forming superposed oven chambers, of an oven door for closing said chambers, said door having an auxiliary door forming access to the lower oven chamber, a flange formed on said door contacting the flange of the division and said doors in closed position.

3. An oven door for ovens having superposed oven chambers, comprising a main door frame having sight openings at the upper portion thereof, and provided with an auxiliary door opening in the lower portion thereof, a door pivotally mounted on the main door frame for closing said auxiliary door opening, glass plates arranged over said side openings, and a frame secured to said door surrounding said glass plates.

4. In an oven having superposed oven chambers formed by a division plate having a vertically disposed flange at its forward edge, of a door for closing said oven chambers, said door having a horizontally disposed flange contacting with the vertically disposed flange of the division plate, and an auxiliary door formed in the main door affording access to the lower oven chamber.

5. The combination with an oven having a horizontally disposed division plate forming superposed oven chambers, of a door for closing said oven chambers, said division plate having a vertically disposed flange, said door having a horizontally disposed flange contacting with the flange of the division plate.

6. In an oven having a horizontally disposed division plate provided with a depending flange, of a door for closing said oven having an auxiliary door in the lower portion thereof and provided with sight openings in the upper portion thereof, glass plates for closing said sight openings, a frame for securing said glass plates within said side openings, and a horizontally disposed flange formed on said inner frame contacting with the vertically disposed flange of the division plate.

7. In an oven having a division plate forming a pair of superposed oven chambers, of a main door for closing said oven chambers, having a portion contacting with said division plate, said main door having an auxiliary door in the lower portion thereof forming access to the lower oven chambers.

In testimony whereof I hereunto affix my signature in the presence of two witnesses.

ANSELM T. NYE.

Witnesses:
D. E. WOODFORD,
LEW SCHAFFER.